United States Patent [19]

Walker, Jr. et al.

[11] Patent Number: 4,928,425
[45] Date of Patent: May 29, 1990

[54] GREENHOUSE WITH INTEGRAL HUMIDIFIER

[76] Inventors: Robert M. Walker, Jr.; Robert M. Walker, Sr.; Laura B. Walker, all of 3620 Homeway Dr., Los Angeles, Calif. 90008

[21] Appl. No.: 276,522

[22] Filed: Nov. 28, 1988

[51] Int. Cl.⁵ ............................................. A01G 9/00
[52] U.S. Cl. ........................................ 47/18; 47/48.5
[58] Field of Search ............................. 47/17, 18, 48.5

[56] References Cited

U.S. PATENT DOCUMENTS

| | | | |
|---|---|---|---|
| 796,027 | 8/1905 | Wittbold | 47/18 |
| 1,000,070 | 8/1911 | Camp | 47/18 |
| 1,504,721 | 8/1924 | Sauve | 47/17 |
| 1,876,571 | 9/1932 | Acuff | 47/18 |
| 1,930,983 | 10/1933 | Russell | 47/18 |
| 2,046,601 | 7/1936 | Atkinson | 47/17 |
| 3,869,826 | 3/1975 | Fischer | 47/18 |
| 4,340,179 | 7/1982 | Knapp | 47/48.5 |
| 4,603,506 | 8/1986 | Powell | 47/48.5 |
| 4,622,950 | 11/1986 | Greenbaum | 47/17 |

FOREIGN PATENT DOCUMENTS

| | | | |
|---|---|---|---|
| 2511221 | 2/1983 | France | 47/17 |
| 7004891 | 10/1970 | Netherlands | 47/17 |

Primary Examiner—Henry E. Raduazo
Attorney, Agent, or Firm—Albert O. Cota

[57] ABSTRACT

A greenhouse having a hollow framework structure (20) with water under pressure fluidly disposed inside characterizing a combined structural frame and water pipe. A number of spray nozzles (34) are attached to the framework at appropriate locations and drippers (60) are, likewise, attached. The nozzles atomize the water increasing the humidity inside the greenhouse and the drippers water the plants beneath. A transparent enclosure consisting of walls (42) and a roof (44) envelope the framework and are attached with straps (50). Air ciculation is achieved by windows (52) and vents (54) along with an optional fan (56).

18 Claims, 4 Drawing Sheets

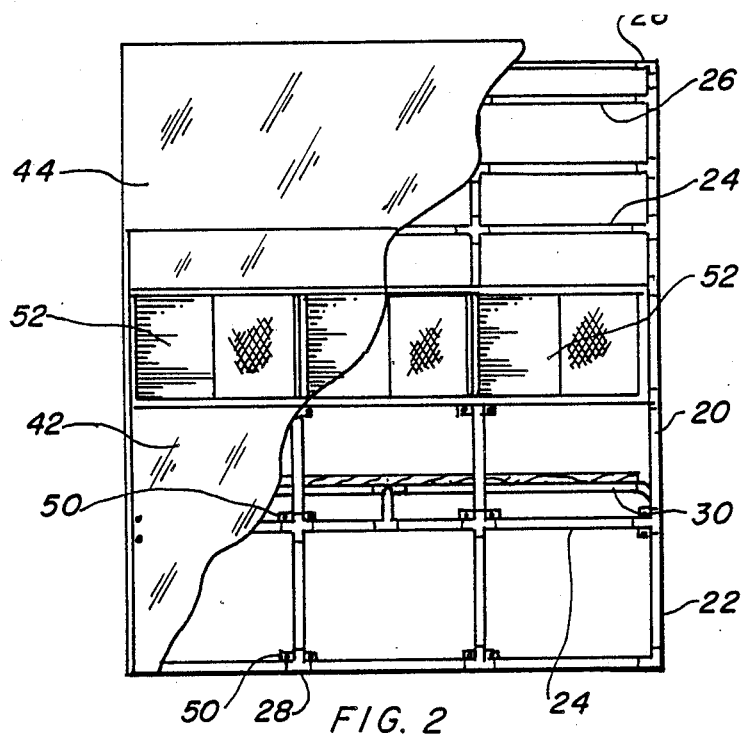
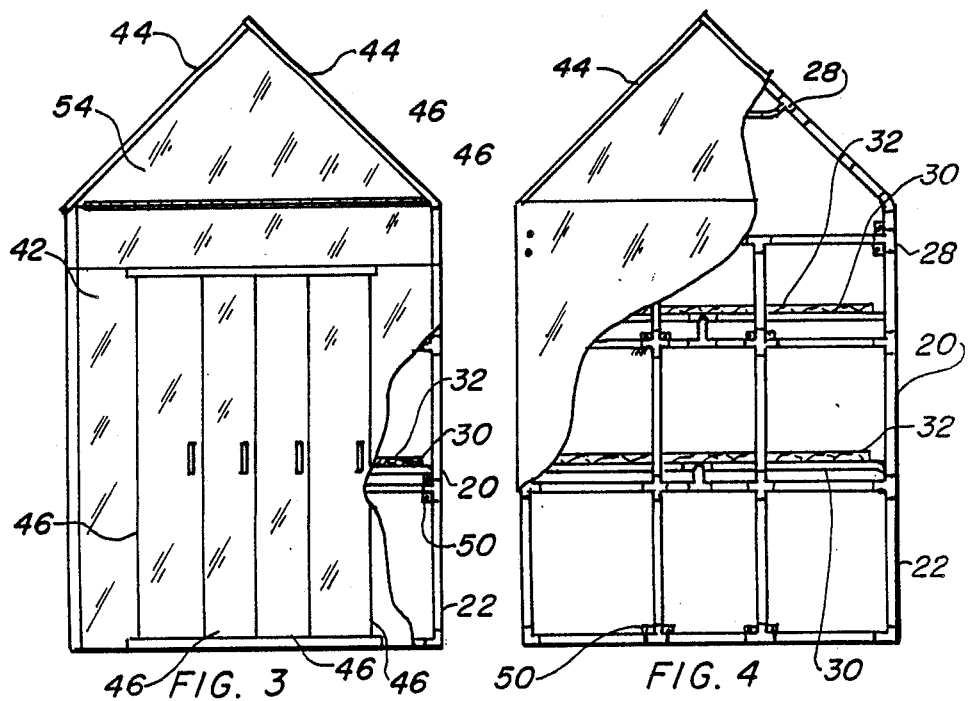

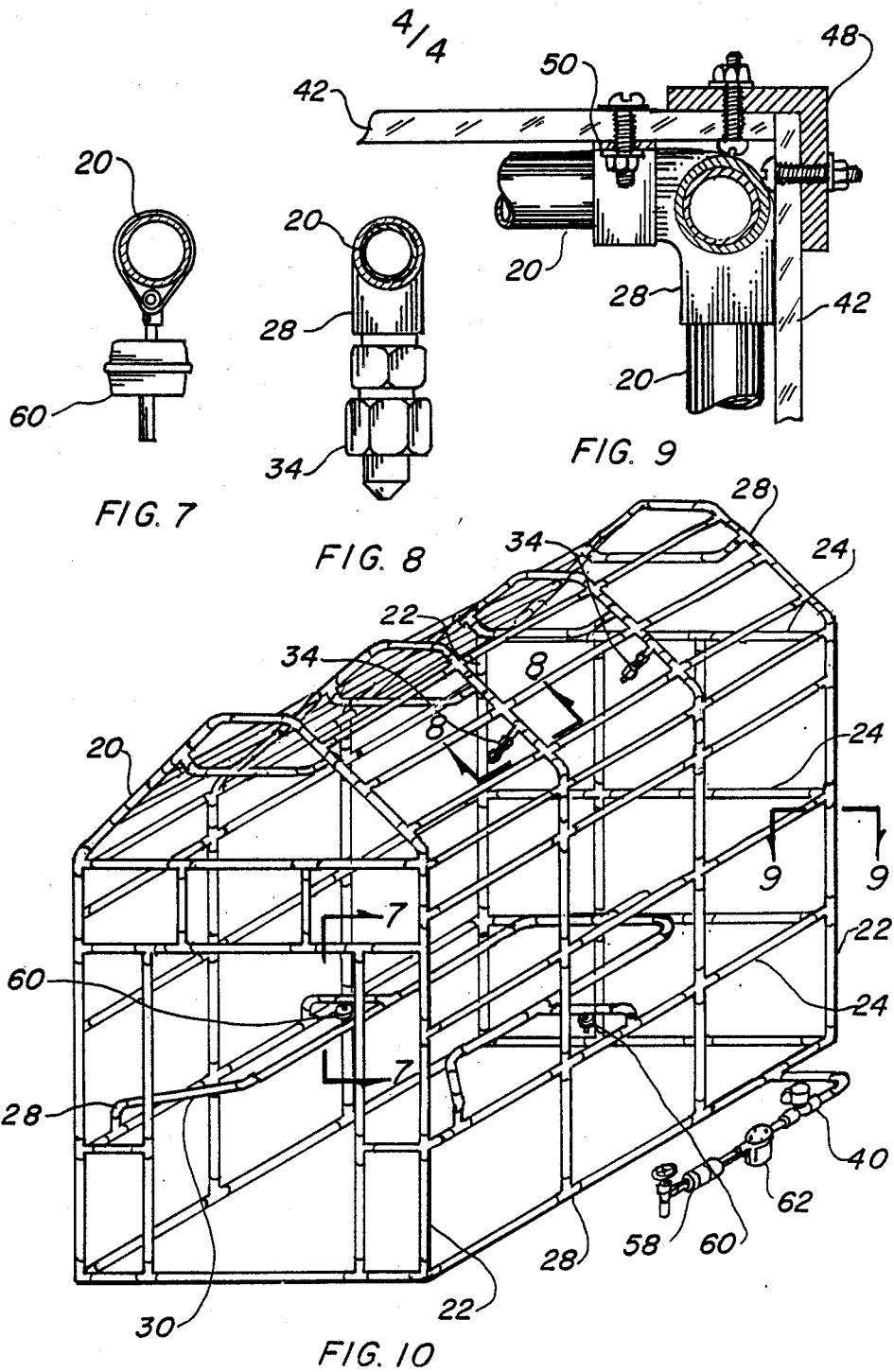

GREENHOUSE WITH INTEGRAL HUMIDIFIER

TECHNICAL FIELD

The present invention relates to greenhouses and like buildings in general, and more particularly to structural frameworks that support transparent panels, roof and ancillary access elements while providing an integral humidifying system.

BACKGROUND ART

Greenhouses or solariums have been in popular use for centuries and have been constructed in many forms and in many ways. Basically, greenhouses enclose areas and allow sunlight to penetrate through the enclosure, in order to optimize the growing environments for plants. Not only temperature must be controlled, but also the minimum humidity. Excess humidity is usually not a problem, therefore, dehumidification is not basically considered, however, humidification in most parts of the temperate zone of the earth require attention.

Prior art has overcome this problem of the water vapor pressure in the air being too low by adding a humidifier consisting of a separate distribution system for pressurizing water and a number of atomizing spray nozzles to add moisture into the air. While the need has been filled, the problem of distribution in a neat and orderly manner without being in the way has still been lacking, also the cost of installation after the greenhouse has been fabricated has still been unapproached and an integral distribution system was heretofore yet to be found.

A search of the prior art did not disclose any patents that read directly on the claims of the instant invention, however, the following U. S. patents were considered related:

| U.S. Pat. No. | Inventor | Issue Date |
| --- | --- | --- |
| 4,601,139 | Esposito | Jul. 22, 1986 |
| 4,505,066 | Moore | Mar. 19, 1985 |
| 4,209,943 | Moeller et al | Jul. 1, 1980 |
| 4,175,361 | Kumode | Nov. 27, 1979 |
| 3,961,442 | Carter | Jun. 8, 1978 |
| 4,091,566 | Horvath et al | May 30, 1978 |
| 4,057,941 | Schwartz | Nov. 15, 1977 |
| 4,045,911 | Ware | Sep. 6, 1977 |
| 3,812,616 | Koziol | May 28, 1974 |

Esposito teaches a greenhouse with two gable ends formed of a framework using gable adapters of reversible configuration. Vertical bars are used between sloped bars and are of an aluminum extrusion arranged in mirror image.

Schwartz discloses a modular greenhouse construction in which panels are prefabricated from a universal beam made of an aluminum extrusion. The universal beam has a spline receiving channel for attaching screening and a ribbed channel on the opposite surface to permit joining of other members without pre-drilling. The beam is substantially hollow, however, not liquid tight and the ends do not necessarily allow communication therebetween.

Carter in U.S. Pat. No. 3,961,442 presents a portable greenhouse made of panels and doors with the upper edges of the walls bolstering a row of upwardly arched roof ribs supporting a plastic canopy. The wall framework is constructed of redwood material bolted together.

Koziol teaches a portable greenhouse having a basic support structure with sides covered with a rollable member enclosing the greenhouse by unrolling over the top. The support structure is fabricated of $\frac{3}{4}$ inch outside diameter metal tubing connected by either welding or female connectors at the joints. The structural tubing is not liquid tight, as the sections are removable for portability and some joints are butt welded into the sides of other members creating a wall therebetween on the inside.

As it is clearly evident, prior art has not addressed the problem of humidification by using already essential structure for a water flowpath.

For background purposes and as indicative of the art to which the invention relates, reference may be made to the remaining cited patents, issued to Moore, Horvath et al, Moeller et al, Kumode and Ware.

DISCLOSURE OF THE INVENTION

Since the need to humidify the interior of a greenhouse has been with us since its inception, it is a primary object of the invention to combine the structural frame with a water distribution system and integral mounting for spray nozzles, thus incorporating the entire humidifying system into the frame without additional water piping added later. Further, the frame not only includes the water system, but also provides the structural integrity to hold a separate transparent structure on the outside, including walls, roof, windows, and doors. This is accomplished by utilizing a hollow pipe framework with fittings at intersecting joints, allowing water to be pressurized inside and atomizing nozzles added at appropriate locations providing a multi-functional frame at a minimum of cost and a maximum flexibility.

An important object of the invention allows the use of cost effective material for the frame in the form of commercially available, rigid polyvinyl chloride pipe and molded fittings. Since these materials are in common usage and competitively manufactured in quantity, the cost is held to a minimum. The standard weight, (wall thickness) or so-called schedule 40 pipe has sufficient structural strength to produce a rigid, strong framework for the greenhouses. It is also possible to substitute other materials, such as galvanized iron pipe or copper pipe with equal results, however, at an increased cost.

Another object of the invention is directed to the use of so-called PLEXIGLAS thermoset plastic for the walls and roof. This material allows drilling for attachment to the frame and is rigid, yet has ample flexural yield strength for the application. The material is transparent and has greater impact strength than glass, which is normally used for greenhouses, as the required thickness is greater for the large surface area required and is obviously not as brittle.

Still another object of the invention allows easy addition of ancillary equipment, such as a drip system, a timer actuated solenoid water control system, a self-fertilization system, as well as ventilating fans inside to control air circulation and prevent stratification within the interior of the greenhouse.

Yet another object of the invention allows various shapes of the greenhouse to be made using all of the same elements, only in different form, such as rectangular, square, octagonal, triangular, etc. Since many greenhouses add to the appearance of a yard, particular shapes and forms may be easily made using the tubular frame and sectionalized enclosure at little or no particular increase in cost of material and only slight labor variation.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 2 is a side elevational view of the preferred embodiment.

FIG. 3 is a front elevational view of the preferred embodiment.

FIG. 4 is a rear elevational view of the preferred embodiment.

FIG. 7 is a cross-sectional view taken along lines 7—7 of FIG. 10 illustrating the connection of the drip system.

FIG. 8 is a cross-sectional view taken along lines 8—8 of FIG. 10 illustrating the position of the spray nozzle relative to the framework.

FIG. 9 is a cross-sectional view taken along lines 9—9 of FIG. 10 illustrating the hat section shaped straps attaching the enclosure to the framework.

FIG. 10 is a partial isometric view of the framework including the drip system, fertilizer system, vacuum breaker and solenoid valve completely removed from the invention for clarity.

BEST MODE FOR CARRYING OUT THE INVENTION

Figure 1:
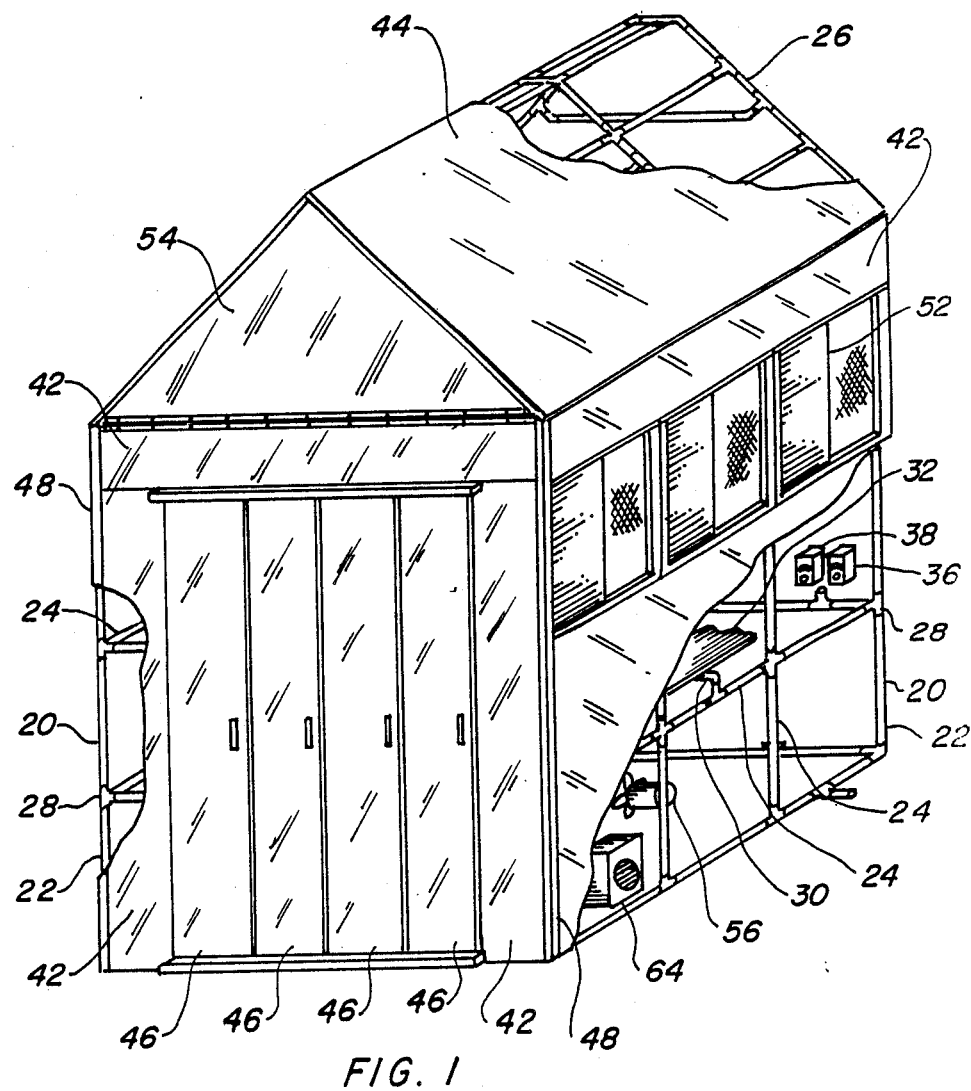
FIG. 1 is a partial isometric view of the preferred embodiment with a section cut-away illustrating the framework structure.
Figure 5:
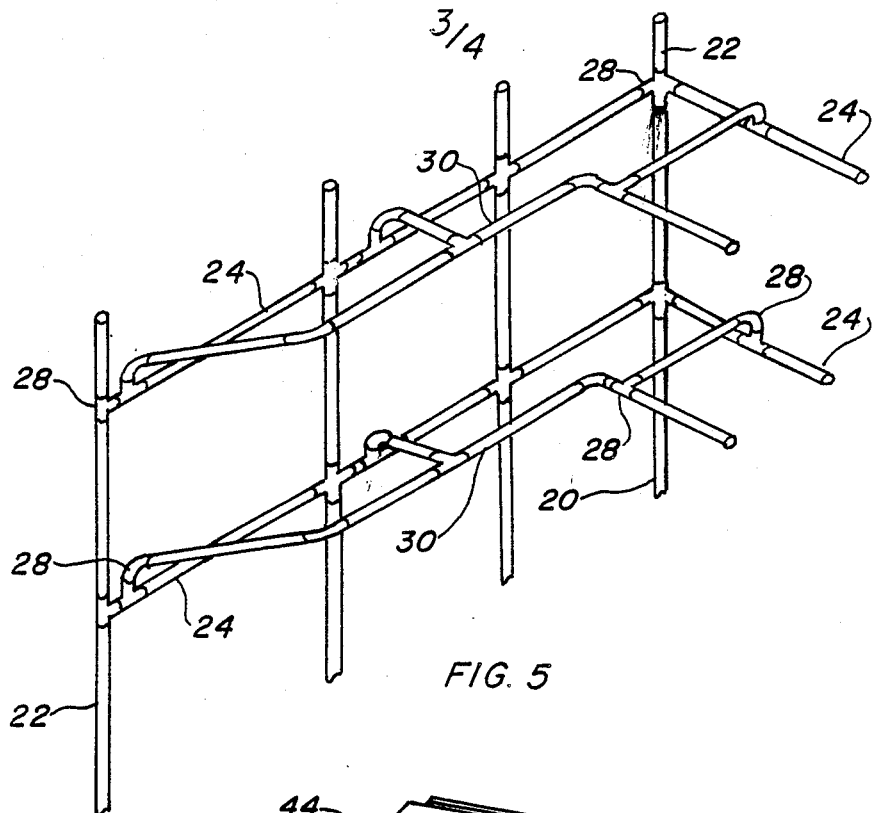
FIG. 5 is a partial isometric view of the hollow framework structure including the shelf substructure cut in half completely removed from the invention for clarity.
Figure 6:
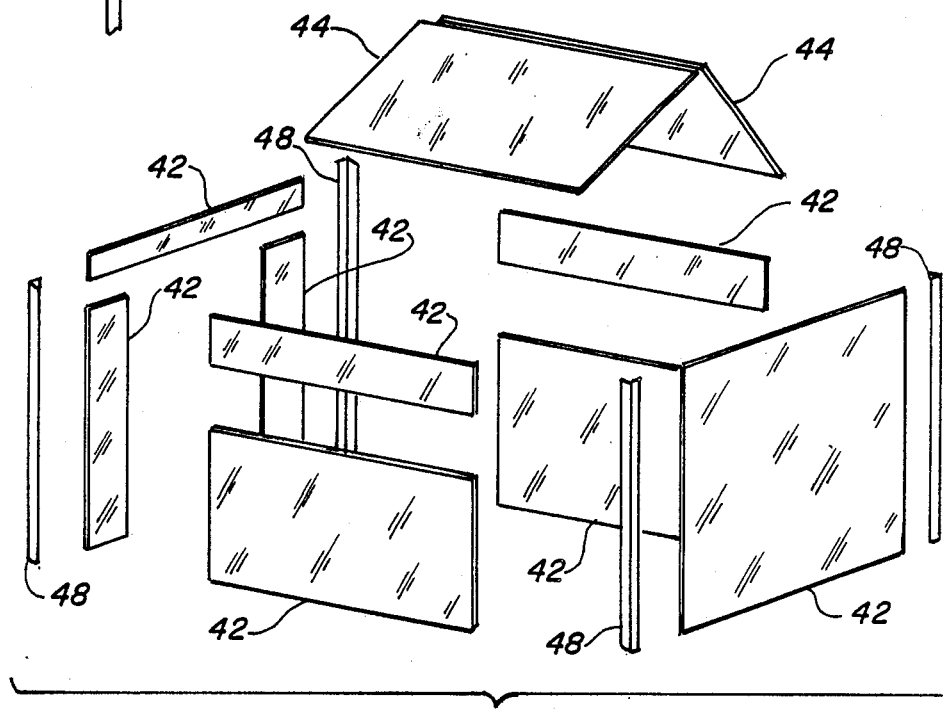
FIG. 6 is an exploded view of the transparent enclosure less windows and doors completely removed from the invention for clarity.

The best mode for carrying out the invention is presented in terms of a preferred embodiment. The preferred embodiment, as shown in FIGS. 1 through 10, is comprised of a hollow framework structure 20 having upwardly extending corner members 22, a plurality of connecting members disposed therebetween in both a horizontal and vertical manner, and a plurality of roof members 26. The above members forming the framework are connected together with fittings 28 in a watertight manner, allowing the entire structure to be in internal communication with each other, permitting water under pressure to be contained inside. The framework 20 is illustrated in FIG. 10 completely removed from the invention depicting the interconnection in a typical rectangular configuration. It will be noted that the shape may be easily changed to an octagon, a square, a triangle, etc., with either a triangular or pitched angular roof allowing rain to be angularly deflected therefrom.

An integral shelf substructure 30 is preferably included in the interior of the framework and projects inward horizontally having removable shelves 32 resting thereupon. These shelves 32 may be of any material, such as wood, thermoplastic metal, or the like, and serve to provide a resting place for plants.

The framework structure 20 and shelf substructure 30, along with the fittings 28, are all joined together in a watertight manner and are made of a round pipe, preferably thermoplastic, such as rigid polyvinyl chloride in the standard or schedule 40 wall thickness. The ½ inch nominal diameter (1.3 cm) has proven optimum, however, the ¾ inch (1.9 cm) size may also be used. This type of pipe is readily available and fittings are provided in all shapes and angles, making this type of construction paragon for this application. While thermoplastic is the paramount choice, metallic pipe may also be used with equal ease in either steel with a galvanized surface coating, or copper having a relatively thin wall thickness. The connections of the fittings to the pipe, in order to maintain fluidic integrity, is accomplished by the use of a bonding cement with the thermoplastic partially dissolving the contiguous surfaces together forming a homogenious joint, threads in the steel pipe and braced joints using a dissimilar metal having a lower melting point than the parent metal are used with the copper pipe.

The entire frame is connected together in a watertight manner, allowing water under pressure to be disposed completely within allowing flow to be dispersed at the most convenient location by the addition of water atomizing means. This atomizing means consists of a plurality of spray nozzles 34 mechanically joined to the pipe framework through threads. Since the addition of this element is restricted by only the inclusion of a threaded fitting, any number of nozzles 34 may be added at any location optimizing the entire system. The spray nozzles 34 atomize the water into droplets allowing the fine spray or mist to enter the interior, evaporating into the air, thereby increasing the moisture content and, hence, the relative humidity.

As an accessory to the system, a timer 36 or humidistat 38 may be added in conjunction with an electrically actuated normally closed electromechanical solenoid valve 40. This additional system allows the interior of the greenhouse to have minimum humidity control employing the humidistat 38, or control by time duration using the timer 36, which allows plants, such as orchids, that obtain moisture from the air for proprigation to be properly fed. The devices are illustrated in FIG. 1 in the interior corner, however, the location may be altered within the enclosure, depending upon the layout and application. The humidistat 38 senses the wet bulb temperature and energizes the solenoid valve 40 when the relative humidity falls below a preset level. The timer 36 cycles the spray nozzles 34 on at predetermined times and durations to accomplish the same basic purpose.

Transparent enclosure means contiguously encompass the framework 20 allowing sunlight to penetrate and, yet, prevents air from passing through. These enclosure means consist of a plurality of vertical walls 42 and an angular roof 44 attached together at the corners, forming an envelope around the framework 20 and doors 46. The walls 42 and roof 44 are fabricated of a transparent plastic of any formulation, however, a thermoset plastic of cast acrylic methyl methacrylate, commonly known by the tradename PLEXAGLAS, has proven satisfactory for the application and is the preferred material in a thickness of ¼ inch (0.64 cm) for the walls 42 and roof 44 and ½ inch (1.28 cm) for the doors 46. The shape of the enclosure may vary without departing from the scope of the invention, however, the preferred embodiment is illustrated in FIGS. 1 through 4 and shown removed from the invention and exploded in FIG. 6. The walls 42 and roof 44 are held together at the corners by an angular upright 48 of thermoplastic fasteners using holes through the adjoining members 42 and 44, best illustrated in FIG. 9.

Attaching means in the form of a plurality of hat section shaped straps 50 with threaded hardware connect the walls 42 and roof 44 to the framework 20. The radial portion of the straps 50 are disposed over the pipe members in the framework structures and the legs of the straps extend outwardly parallel with the walls or roof, as depicted in FIG. 9. The threaded hardware, in the form of capscrews, nuts and washers, penetrate either the walls 42 or roof 44, and the straps 50 and, by mechanical compression of the threads, provide a structural bond holding the walls and roof securely to the framework 20. This attaching means allows the greenhouse to withstand the environmental forces of nature, such as wind, rain, snow, sleet, hail, etc., as the two major assemblies compliment each other in structural integrity.

Air circulating means, integral with the greenhouse enclosure, consist of a plurality of adjustable openings in the form of windows 52 or hinged vents 54 that allow air to pass through for limited temperature control. Manual opening or closing of these windows 52 or vents 54 allow air to circulate through the greenhouse equalizing the temperature from the outside ambient, particularly when the suns rays penetrate through the transparent enclosure and heat interior. The windows 52 include frames, with screens, that slide or swing outwardly within a metallic enclosure. These windows 52 are well known in the art and are commercially available in a myriad of sizes and shapes. The vents 54 are made of the same material as the walls 42 and roof 44 and are hinged on one side to pivot outwardly for air passage. As an accessory to the greenhouse, not required for operation, one or more air circulating fans 56 may be included, located within the greenhouse. FIG. 1 illustrated one such fan 56 that functions to maintain circulation within while illuminating stratification of the air at different temperatures. The use of these fans have an averaging effect on the interior temperature and balance the ambient environmental temperature for all of the plants.

Another accessory that may be added, if desired, is a water drip system, partially illustrated in FIGS. 7 and 10, consisting essentially of a vacuum breaker 58 and dripper 60, other components are also required, such as filters, adapters, clamps, vinyl tubing, etc., according to the application, however, this sytem by itself is old and well known in the art. The tubing that is normally furnished in kit form may be utilized simply attached to the bottom of the framework pipes or the drippers 60 may be attached directly to the framework 20 itself, providing the necessary water under pressure. The drip system provides a controlled volume of water at specific locations above the plants for individualized plant feeding.

Similarly, a fertilizer system may be added utilizing an applicator 62 with a removable container for the insertion of solid fertilizer in pellet form in contact with the main water supply to the greenhouse. This sytem allows water to pass over the fertilizer pellet dissolving a given amount of the chemical into the water to be atomized into the interior.

Where environmental conditions require, a heater 64 may be added to the interior for controlling minimum temperatures at low ambient conditions.

If the drip system is not utilized with its vacuum breaker, an anti-syphon valve is required in the main water supply line to the greenhouse. This valve allows water to enter the framework structure 20 and be shut off without backfeeding into the water source.

What is claimed:

1. A light permeable greenouse plant enclosure with an integral humidifier comprising:
   (a) a hollow framework structure having upwardly extending corner members, a plurality of connecting members disposed therebetween and a plurality of roof members, all having internal communication with each other, capable of support pressure inside and sufficient structural integrity to reinforce the greenhouse:
   (b) water under pressure fluidly disposed within said hollow framework defining a distribution network therethrough such that the framework becomes a conduit to circulate water throughout the greenhouse enclosure;
   (c) water atomizing means in communication with both framework structure and said pressurized water, positioned in such a manner as to spray the water in a mist form within the confines of the framework to elevate the humidity of air within the greenhouse;
   (d) transparent enclosure means contiguously encompassing said framework such that sunlight penetrates therethrough while impeding the transmission of air creating an isolated environment conclusive to the growing of plants in a humidified surrounding;
   (e) non-penetrating attaching means connecting the transparent enclosure means securely onto the framework creating a structural bond therebetween allowing the transparent enclosure means to withstand environmental forces, such as wind loading, rain and snow;
   (f) air circulating means integral with said enclosure means defined by said enclosure having a plurality of adjustable openings that allow air entrance and egress providing limited temperature control relative to air heated by the sun's penetration through the transparent enclosure through natural air moving phenomenon; and
   (g) a shelf substructure integral with said hollow framework structure having a plurality of shelves projecting inwardly in a horizontal manner with the shelves removably resting thereupon providing a platform for mounting plants and an attachment position for said atomizing means.

2. The light permeable greenhouse as recited in claim 1 further comprising said framework and enclosure means formed in the shape of a rectangle having a triangular top allowing water in the form of precipitation to flow therefrom.

3. The light permeable greenhouse as recited in claim 1 further comprising said framework and enclosure means formed in the shape of an octagon having a pitched angular top disending from a point allowing water in the form of precipitation to flow therefrom.

4. The light permeable greenhouse as recited in claim 1 wherein said framework and shelf substructure further comprise round thermoplastic pipe and interconnecting fittings joined together in a watertight manner forming a combined structure, water conduit and support for said atomizing means.

5. The light permeable greenhouse as recited in claim 1 wherein said framework and shelf substructure further comprise round metallic pipe and interconnecting fittings joined together in a watertight manner forming a combined structure, water conduit and support for said atomizing means.

6. The light permeable greenhouse as recited in claim 1 wherein said atomizing means further comprise a plurality of spray nozzles in communication with said water and mechanically joined to said hollow framework for mist dispersion within said greenhouse.

7. The light permeable greenhouse as recited in claim 6 further comprising a timer and a solenoid valve in fluid communication with said hollow framework providing timed cyclic control of said spray nozzles for increasing the humidity within the greenhouse at timed intervals.

8. The light permeable greenhouse as recited in claim 6 further comprising a humidistat and solenoid valve in fluid communication with said hollow framework, the humidistat sensing wet bulb temperature and energizing the solenoid valve to allow water to be sprayed in a mist into the interior of the greenhouse upon demand of the humidistat when relative humidity falls below a predetermined level to control a minimum humidity level within the interior of the greenhouse.

9. The light permeable greenhouse as recited in claim 1 wherein said transparent enclosure means further comprise a plurality of vertical walls, at least one door within said walls and an angular roof attached together at the corners forming an envelope around said framework.

10. The light permeable greenhouse as recited in claim 9 wherein said walls, door and roof further comprise a thermoset plastic in the formulation of cast acrylic methyl methacrylate.

11. The light permeable greenhouse as recited in claim 1 wherein said attaching means connecting the enclosure means to the framework further comprise a plurality of hat section shaped straps circumventing the framework having threaded hardware joining the straps to the enclosure means by mechanical compression providing a structural bond therebetween.

12. The light permeable greenhouse as recited in claim 1 wherein said air circulating means further comprise a plurality of windows having frames, with screens positioned within said enclosure means having the capability of opening and closing to allow air to pass through the screen for control of temperature.

13. The light permeable greenhouse as recited in claim 1 wherein said air circulating means further comprise a plurality of vents located within the enclosure means having the capability of hinging open or closed to allow air to pass through for control of temperature.

14. The light permeable greenhouse as recited in claim 1 wherein said air circulating means further comprise one or more motor driven air circulating fans located within the greenhouse interior forcing air within the confines of the enclosure to be moved preventing stratification and averaging the temperature differentials therewithin.

15. The light permeable greenhouse as recited in claim 1 further comprising a water drip system mounted upon the framework structure using the water under pressure to fluidly circulate said water to various locations within the framework location providing a controlled volume of water at defined positions for watering plants.

16. The light permeable greenhouse as recited in claim 1 further comprising a fertilizer applicator integral with said framework structure and in communication with said water the applicator having a removable container for insertion of solid fertilizer in contact with the water allowing water to pass therethrough dissolving a given amount of fertilizer in the water to be sprayed into the greenhouse.

17. The light permeable greenhouse as recited in claim 1 further comprising a heater disposed within the greenhouse to heat air within the interior thereof for controlling minimum temperature at low ambient environmental conditions.

18. The light permeable greenhouse as recited in claim 1 further comprising an anti-syphon valve integral with said framework structure and in communication with said water, the valve allowing the water to enter the framework structure and be shut off without backfeeding into the water source.

* * * * *